(12) United States Patent
Russell et al.

(10) Patent No.: US 11,533,614 B1
(45) Date of Patent: Dec. 20, 2022

(54) SYSTEMS AND METHODS OF MULTI-FACTOR AUTHENTICATION UTILIZING A VEHICLE

(71) Applicant: UIPCO, LLC, San Antonio, TX (US)

(72) Inventors: Ryan Russell, San Antonio, TX (US); Janelle Dziuk, Falls City, TX (US); Gregory Yarbrough, San Antonio, TX (US); Bryan J. Osterkamp, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 167 days.

(21) Appl. No.: 16/933,542

(22) Filed: Jul. 20, 2020

Related U.S. Application Data

(60) Provisional application No. 62/881,177, filed on Jul. 31, 2019.

(51) Int. Cl.
| | |
|---|---|
| *G06K 9/62* | (2022.01) |
| *H04W 4/02* | (2018.01) |
| *H04W 12/06* | (2021.01) |
| *H04W 4/70* | (2018.01) |
| *B60K 37/02* | (2006.01) |

(52) U.S. Cl.
CPC ............ *H04W 12/06* (2013.01); *B60K 37/02* (2013.01); *G06K 9/6215* (2013.01); *H04W 4/027* (2013.01); *H04W 4/70* (2018.02); *B60K 2370/5911* (2019.05)

(58) Field of Classification Search
CPC ....... H04W 12/06; H04W 4/027; H04W 4/70; B60K 37/02; B60K 2370/5911; G06K 9/6215
See application file for complete search history.

(56) References Cited

U.S. PATENT DOCUMENTS

| | | | | |
|---|---|---|---|---|
| 9,083,581 | B1 * | 7/2015 | Addepalli | G06F 3/017 |
| 10,011,248 | B1 * | 7/2018 | Allouche | B60R 25/01 |

\* cited by examiner

*Primary Examiner* — Joseph E Dean, Jr.
(74) *Attorney, Agent, or Firm* — Fletcher Yoder, P.C.

(57) ABSTRACT

Embodiments disclosed herein describe vehicle-based authentication protocols. An illustrative authentication server may receive a request to authenticate a user connected from a mobile device. The authentication server may transmit a request to the mobile device to transmit geolocation data of the mobile device. In response, the mobile device may transmit a stream of its geolocation data. Based upon the received geolocation data stream, the authentication server may determine that the mobile device in a motion and select a vehicle-based authentication protocol to request geolocation data of a trusted vehicle. The authentication server may compare the mobile device geolocation data stream and the vehicle geolocation data stream to determine a similarity score. If the similarity score is above a threshold, the authentications server may authenticate the user. In some cases, the authentication server may authenticate the user if the mobile device is connected to the trusted vehicle.

15 Claims, 5 Drawing Sheets

SYSTEMS AND METHODS OF MULTI-FACTOR AUTHENTICATION UTILIZING A VEHICLE

CROSS REFERENCE TO RELATED APPLICATIONS

This application claims benefit of U.S. Provisional Application Ser. No. 62/881,177, filed Jul. 31, 2019, entitled "SYSTEMS AND METHODS OF MULTI-FACTOR AUTHENTICATION UTILIZING A VEHICLE," which is hereby incorporated by reference in its entirety for all purposes.

TECHNICAL FIELD

This application relates generally to multi-factor authentication and more specifically to authenticating a user connected via phone call utilizing a vehicle associated with the user.

BACKGROUND

Authentication is an integral part of a networked system. The networked system has to confirm the legitimacy of a user's identification claim before allowing the user access to or control over one or more devices in a network. Authentication methods and protocols are therefore used to mitigate various forms of network attacks or otherwise unauthorized use of network resources by malicious actors.

Current authentication protocols generally employ three types of authentication factors: knowledge factors, ownership factors, and inherence factors. The knowledge factors include something a user knows, such as passwords and personal identification numbers. The ownership factors include something the user has (or possesses), such as identification cards and security tokens. The inherence factors include what the user is, such as fingerprints and retinal scans. Multi-factor authentication protocols may use a combination of these factors and/or a combination of multiple pieces of information (or entries) associated with a single factor. For example, an authentication protocol may prompt a user to enter a password (a knowledge factor) and a code generate by a security token dongle (an ownership factor).

However, multi-factor authentication protocols that use multiple prompted entries from a user may be cumbersome and inefficient. Sometimes these protocols may be inconvenient and even dangerous for users. For example, a user may make a phone call while driving a vehicle. An authentication protocol may prompt a user to enter an alphanumeric code on the phone or another electronic device, which is extremely inconvenient or potentially dangerous for the user. Some authentication protocols may also require the user to manually enter another alphanumeric code on a graphical user interface on the vehicle. Inputs to the graphical user interfaces integrated in vehicle dashboards may be deactivated while the user is driving.

As such, a significant improvement upon authentication protocols is required for authenticating a user, particularly while the user is driving.

SUMMARY

What is therefore desired are systems and methods that authenticate a user while the user is driving with minimal physical actions from the user. What is further desired are systems and methods that leverage a trusted/registered vehicle (e.g., a vehicle associated with the user) to authenticate the user.

Embodiments disclosed herein attempt to solve the aforementioned technical problems and may provide solutions to other technical problems as well. An illustrative authentication server may receive a request to authenticate a user connected from a mobile device (or user device) to an enterprise server. The user may be connected to the enterprise server through a phone call and/or through an application being executed by the mobile device. The authentication server may transmit a request to the mobile device to transmit geolocation data and/or metadata of the mobile device. In response, the mobile device may transmit a stream of geolocation data (e.g., a periodically transmit updated geolocation data) of the mobile device. Based upon the received stream of geolocation data, the authentication server may determine that the mobile device is in motion. More particularly, based upon the rate of change of geolocations as indicated by the stream of geolocation data, the authentication server may determine that the mobile device is more likely in a vehicle and that a vehicle-based authentication method may be utilized. Based upon this determination, the authentication server may request geolocation data of a vehicle associated with the user. In some embodiments, a computer may transmit a request to the mobile device to query and retrieve the vehicle geolocation data and stream the retrieved the geolocation data to the authentication server. In other embodiments, the authentication server may have a communication link to the vehicle and may transmit to the vehicle directly a request to transmit the geolocation data. In response, the vehicle may stream its geolocation data to the authentication server. Regardless of the receipt of the vehicle geolocation data stream, the authentication server may compare the mobile device geolocation data stream and the vehicle geolocation data stream to determine a similarity score. In response to determining that the similarity score is above a threshold, the authentication server may authenticate the user. In some cases, the authentication server may authenticate the user if the mobile device is connected to the vehicle that is associated with the user without necessarily comparing geolocation data streams.

In an embodiment, a method comprises receiving, by a computer, a first request to authenticate a user connected from a mobile device; transmitting, by the computer, a second request to an application on the mobile device to stream geolocation data of the mobile device; receiving, by the computer, a first stream of geolocation data of the mobile device in response to the second request; selecting, by the computer, a vehicle-based authentication protocol in response to the computer determining that the mobile device is in motion based upon the first stream of geolocation data, the vehicle-based authentication protocol comprising the steps of: transmitting, by the computer, a third request to the application on the mobile device to query and retrieve geolocation data of a vehicle associated with the user; receiving, by the computer from the application on the mobile device, a second stream of geolocation data of the vehicle associated with the user; comparing, by the computer, the first stream and the second stream to determine a similarity score; and authenticating, by the computer, the user in response to the processor determining that the similarity score exceeds a predetermined threshold.

In another embodiment, a system comprises a non-transitory storage medium configured to store a plurality of computer program instructions; and a processor electrically coupled to the non-transitory storage medium and configured to execute the plurality of computer program instructions to: receive a first request to authenticate a user connected from a mobile device; transmit a second request to an application on the mobile device to stream geolocation data of the mobile device; receive a first stream of geolocation data of the mobile device in response to the second request; select a vehicle-based authentication protocol in response to the processor determining that the mobile device is in motion based upon the first stream of geolocation data, the vehicle-based authentication protocol that causes the processor to: transmit a third request to a vehicle associated user to stream geolocation data of the vehicle; receive a second stream of geolocation data from the vehicle; compare the first stream and the second stream to determine a similarity score; and authenticate the user in response to the computer determining that the similarity score exceeds a predetermined threshold.

In yet another embodiment, a computer-implemented method comprises receiving, by a computer, a first request to authenticate a user connected from a mobile device; transmitting, by the computer to an application in the mobile device, a second request to retrieve and transmit identifying information of local connections of the mobile device; receiving, by the computer from the application in the mobile device, identifying information of one or more local connections of the mobile device to other proximate devices in response to the second request; determining, by the computer, based upon the identifying information of at least one of the other proximate devices that the mobile device is connected to a vehicle associated with the user; and authenticating, by the computer, the user based upon determining that the mobile device is connected to the vehicle associated with the user.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods multi-factor authentication utilizing a vehicle (also referred to as vehicle-based authentication). The vehicle-based authentication protocols described herein are less cumbersome, involve minimal user actions, and are particularly useful when a user is driving. Although the embodiments herein are described in terms of communications and processing between a back-end authentication server, a vehicle, and a user device; this structural setup is merely for illustration and should not be considered limiting. For example, there might be additional intermediate devices, such as an enterprise server and the user device and the vehicle. Furthermore, processing steps ascribed to the authentication server may be performed by the one or more of the user device, the vehicle, and one or more intermediate devices.

The authentication server may receive a request to authenticate a user connected to an enterprise server and determine that the user is in motion. The authentication server may determine the user's motion based upon a stream of geolocation data of a user device associated with a user. For instance, when the authentication server receives the authentication request, the authentication server may use a piece of information in the request (e.g., a phone number) to look up device identification information of the user device. The authentication server may then communicate with the user device utilizing the device identification to request and retrieve the stream of geolocation data. The authentication server may observe the change of geolocation over a period of time (e.g., the geolocation changing several feet every second) as indicated by the stream of geolocation data and determine that the user device and therefore the user is in motion. The authentication server may then select the vehicle-based authentication protocol for the moving user.

For the vehicle-based authentication, the authentication server may request that the user device transmits a second stream of geolocation data of a vehicle associated with the user. The vehicle may be a trusted vehicle. For example, the user may provide identifying information of the vehicle (e.g., media access control and/or Bluetooth identifier of the dashboard system) at a registration session with the authentication server. The authentication server may include such vehicle identifying information in the request to the user device to query, retrieve, and stream the geolocation data of the vehicle. In response, the user device may query the geolocation data of the vehicle through a local connection (e.g., Bluetooth), retrieve the geolocation, and stream the retrieved geolocation data to the authentication server.

In the instances where the authentication server may communicate with the vehicle without including the user device, the authentication server may request the vehicle to provide the geolocation data. In response, the vehicle itself may stream the geolocation data to the authentication server without providing such stream to the user device. Regardless of how the stream of geolocation data of vehicle is received, the authentication server may compare the stream of geolocation data of the user device with the stream of geolocation data of the vehicle. Based upon the comparison, the authentication server may determine that the user is in the trusted vehicle and utilize this trust to authenticate the user.

In some instances, the authentication server may authenticate the user based upon the local connections of the user device. In response to receiving a request to authenticate the user, the authentication server may request the user device to send information about one or more other devices within a local network of the user device. For example, the other devices may be within an ad hoc Bluetooth network of the user device. The authentication server may determine, based upon the received information of the other devices, that one of the other devices is a vehicle dashboard system of a trusted vehicle. In other words, the authentication server may authenticate the user based upon a local connection of user device to the trusted vehicle. The authentication server may select this form of authentication when a weak authentication if desired, e.g., for tasks requiring lower level of security.

The authentication server may also implement defense protocols against spoofing attacks. For example, an attacker may have an open network that may emulate a vehicle with spoofed geolocation data. The attacker may be able to spoof the geolocation data based upon the information of a victim's vehicle, which the attacker may have collected through means such as social engineering. The network may then emulate the victim's vehicle and provide a spoofed geolocation data to the user device. To counter this type of spoofing attack, the authentication server may utilize the sensors in the user device to detect whether the user device is in motion. For instance, the user may have parked just parked the vehicle half a mile away and the geolocation data stream of the vehicle (from the vehicle itself or through the user device) may indicate that the user is in motion with the vehicle. The authentication server may retrieve data from sensors (e.g., accelerometers) in the user device to determine whether the user device is in motion consistent with the geolocation data stream received from the vehicle. The authentication server may also compare the data from the sensors in the user device is known behavior profiles. The accelerometer data may indicate that the user may be walking or sitting and the authentication server may compare such indication with the motion behavior determined from the stream of geolocation data from the vehicle.

The authentication server may also determine during enrollment whether a vehicle qualifies for the implementing one or more vehicle-based authentication operations described herein. The qualifying vehicles may provide a local connectivity between the vehicle (e.g., a vehicle dashboard system) and the user device and a remote connectivity between the vehicle and the authentication server. The local connectivity may be provided by, for example, an in-built Bluetooth connection or a corresponding aftermarket addition. The remote connectivity may be provided by, for example, an in-built 3G/4G/LTE/5G data connection or a corresponding aftermarket addition. During enrolment, the authentication server may prompt the user/user device to perform testing operations with the vehicle and determine whether the vehicle qualifies based upon the data from the testing operations.

It should be understood that the description of the user connected to an enterprise server through a phone call or through an application is for illustrative purposes only and should not be considered limiting. The user may be connected to the enterprise server through any of the IP, telephony, and mobile messaging (e.g., SMS, MMS) channels. It should further be understood that in addition to the geolocation data and sensor data, a user device may transmit other metadata to the authentication server. The metadata may include, for example, a destination phone number or a destination IP address, duration of connection to the enterprise server, number of connection attempts made, and/or any other type of metadata.

Figure 1:
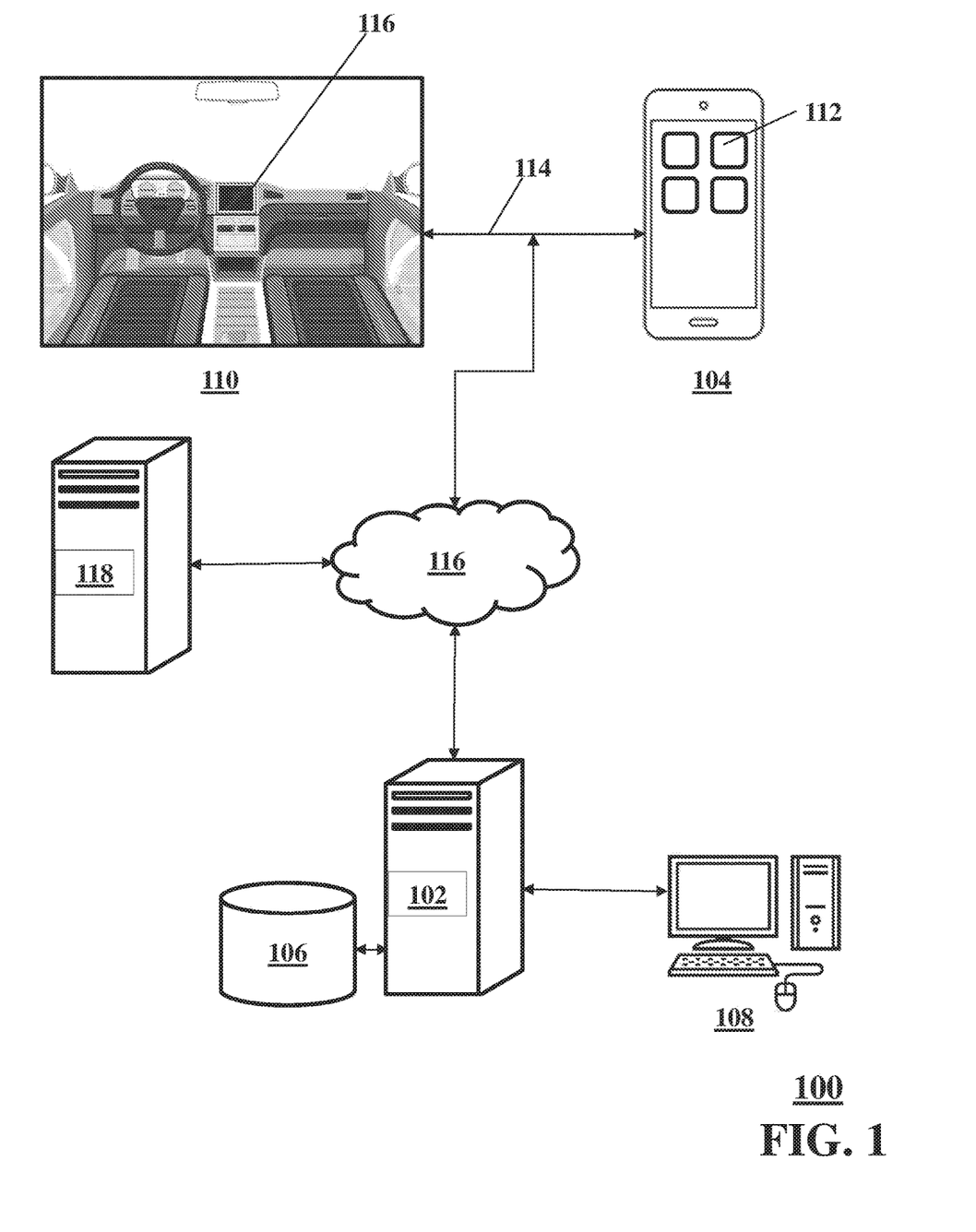
FIG. 1 shows an illustrative network environment for vehicle-based authentication, according to an embodiment.

FIG. 1 shows an illustrative network environment 100 for vehicle-based authentication, according to an embodiment. As shown, the illustrative network environment 100 may comprise an authentication server 102, a user device (also referred to as mobile device) 104, a vehicle dashboard system 110, and an enterprise server 118. It should be understood that components shown in FIG. 1 are merely illustrative and network environments with additional, alternate, or fewer number of components should also be considered within the scope of this disclosure.

The authentication server 102 may be any kind of computing device (or a collection of computing devices) performing the authentication functionality described herein. The authentication server 102 may include, for example, a server computer, a desktop computer, a laptop computer, a tablet computer, and a smartphone. Regardless of the form, the authentication server 102 may include a non-transitory storage storing a plurality of computer program instructions and processor executing the plurality of computer program instructions. The non-transitory storage medium may include any form of electronic memory or electronic storage such as random-access memory (RAM) and hard disk drives. The processor may be any kind of processor such as an x86 processor, a MIPS processor, and an ARM processor. The authentication server 102 may be also be connected to a database 106. The database 106 may store data records containing information of a plurality of users, plurality of devices (e.g., user device 104), and other systems (e.g., vehicle dashboard system 110) associated with a plurality of users. The authentication server 102 may therefore perform one or more database queries, retrievals, and/or updates for authenticating each user in the network environment 100. It should be understood that although the database 106 is shown separately shown from the authentication server 102, the database 106 may be within the authentication server 102.

A computer terminal 108 may be connected to the server 102. The computer terminal 108 may allow a system administrator to access the resources and the functionality of the server 102. The computer terminal 108 may also allow the system administrator to program/configure the server 102 to implement the authentication functionality described throughout this disclosure. The computer terminal 108 may also present an interface for the system administrator to monitor the operation of the server 102 and/or perform other ancillary operations associated with the authentication functionality.

The user device 104 may be any kind of computing device. For example, the user device 104 may be laptop computer, a tablet computer, a wearable device, or a smartphone. Regardless of the form, the user device 104 may include a non-transitory storage medium storing a plurality of computer program instructions and a processor configured to execute the plurality of computer program instructions. The non-transitory storage medium may include any type of electronic memory or electronic storage, such as RAMs and hard-disk drives. The processor may be any kind of processor such as an x86 processor, a MIPS processor, or an ARM processor. The client device 104 may have a plurality of applications (or apps) installed thereon. An illustrative application has been shown as 112. It should be understood that the user device 104 is shown as a smartphone merely for illustration and should not be considered limiting. For example, the user device 104 may be a wearable device (e.g., a smartwatch), a laptop computer, or a tablet computer as described above.

The vehicle dashboard system 110 may be an electronic system integrated within any kind of vehicle. The vehicle dashboard system 110 may include components such as a graphical user interface (GUI) 116 integrated within the dashboard of the vehicle. The GUI 116 may be an interface for the user to configure various functionality within the vehicle. For example, the user may configure climate control settings and internal illumination settings through the GUI 116. The GUI 116 may also provide a vehicle navigation interface to input a destination address and track progress to the destination address. In addition to the GUI 116, the vehicle dashboard system 110 may have other electronic components such as a global positioning system (GPS) receiver and a radio receiver. The GPS receiver may geolocate the vehicle based upon signals received from a subset of GPS satellites.

The vehicle dashboard system 110 may also provide a connectivity to the user device 104. More particularly, the user device 104 may be connected to the vehicle dashboard system 110 through a local connection 114 to create an ad hoc communication channel between the user device 104 and vehicle dashboard system 110. The local connection 114 may be any type of wired or wireless connection. A wired connection may be, for example, a universal serial bus (USB) connection of the user device 104 to the vehicle dashboard system 110. A wireless connection may be, for example, through Bluetooth, Bluetooth Low Energy (BLE), or Wi-Fi. It should however be understood that the aforementioned are merely some examples of the local connection 114 and other types of connection should also be considered within the scope this disclosure.

The network 116 may be any kind of network, including any type of packet switching or circuit switching network. The network 116 may therefore contain any kind of packet switching or circuit switching communication links. These communication links may be either wired or wireless. For example, the network 116 may include packet switching networks such as a local area network (LAN), metropolitan area network (MAN), wide area network (WAN), and the Internet. The network 116 may include ad hoc networks/ links such as a Bluetooth communication or a direct wired connection between the client device 104 and the authentication server 102. The network 106 may also include circuit switching network as a telephony network containing wired and/or wireless telephony communication links. Therefore, network of any order of complexity should be considered within the scope this disclosure.

The enterprise server 118 may be any kind of computing device (or a collection of computing device) hosting enterprise functionality. For example, the enterprise server 118 may be associated with a bank and accordingly host banking functionality. The authentication server 102 may authenticate a user to access functionality provide by the enterprise server 118.

In operation, the authentication server 102 may receive a request to authenticate a user connected to the enterprise server 118 from the user device 104. The user may be connected to the enterprise server 118 through a phone call from the user device 104 or through an application (e.g., application 112) being executed by the user device 104. In response, the authentication server 102 may transmit a request to the user device 104 to stream geolocation data of the user device 104 to the authentication server 102. The phone call may be connected through a telephony channel in the network 116 and the request to the user device 104 from the authentication server 102 may be through a data channel in the network 116. The application 112 in the user device 104 may receive the request to stream the geolocation data of the user device 104 to the authentication server 102. In response, the application 112 in the mobile device may stream the geolocation data of the user device 104 to the authentication server. For example, the application 112 may provide the geolocation data of the user device 104 periodically, such as every five seconds. Based upon the received stream of geolocation data from the application 112, the authentication server may determine whether the user device 104 is in motion. The authentication server 102 may further determine that the user device 104 is likely to be in a vehicle-based upon a speed associated with the motion. Based upon this determination, the authentication server 102 may select a vehicle-based authentication method because the user may not be able to use screens of electronic devices that the user may have to enter second factor authentication credentials.

The geolocation data stream may include location data (e.g., longitude and latitude, country, region, state, city, zip code, time zone). In one alternative, the stream may indicate a change from a starting position without revealing a particular location of the user device. For example, using a timestamp, the stream may include a first location at an initial time. At a later time, the stream may include a location based on a vectorized or longitude/latitude difference from the first location. Such a configuration may allow the location of a user device to be transmitted in the stream to the authentication server without displaying the actual location, thereby offering some privacy protection.

To implement the vehicle-based authentication method (also referred to as protocol), authentication server 102 may transmit a request to the application 112 on the user device 104 to query and retrieve geolocation data from the vehicle dashboard system 110. In the embodiments where there is a connection between the vehicle dashboard system 110 and the authentication server 102, the authentication server 102 may transmit the request to send geolocation data to the vehicle dashboard system 110 itself. In response to one or more of the aforementioned requests, the authentication server 102 may receive a stream of geolocation data, from mobile device 104 and/or vehicle dashboard system 110. This stream of geolocation data may include the geolocation of the vehicle containing the vehicle dashboard system 110. In one alternative, the stream may indicate a change from a starting position without revealing a particular location of the vehicle. The computer may then compare the stream of geolocation data of the user device 104 with the stream of geolocation data of vehicle dashboard system 110 to generate a similarity score. If the similarity score is above a predetermined threshold, the authentication server 102 may authenticate the user making a phone call through the user device 104 to the enterprise server 118. For weaker authentication protocols, the authentication server 102 may authenticate the user based upon the determination that the user device 104 is connected to the vehicle dashboard system (e.g., a component of a trusted vehicle) through a local connection 114.

Figure 2:
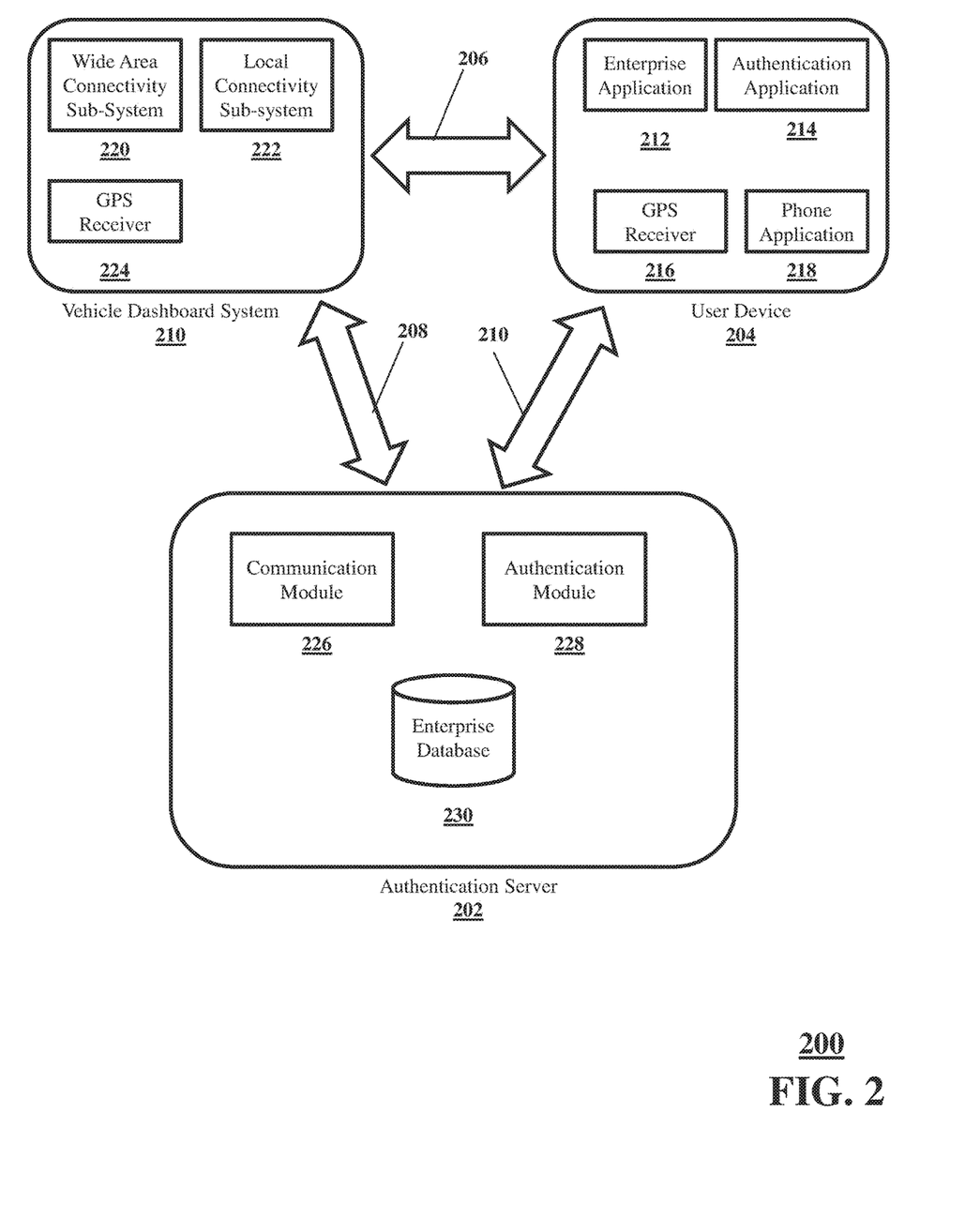
FIG. 2 shows another illustrative network environment for vehicle-based authentication, according to an embodiment.

FIG. 2 shows an illustrative network environment 200 for vehicle-based authentication, according to an embodiment. As shown, the illustrative network environment 200 may comprise an authentications server 202, a user device 204, and a vehicle dashboard system 210. It should however be understood that the components of the illustrative network environment 200 as shown in FIG. 2 and described herein are merely illustrative and additional, alternative, and a fewer number components should also be considered within the scope of this disclosure.

The authentication server 202 may contain a communication module 226, an authentication module 228, and an enterprise database 230. The communication module 226 may be a combination of hardware and software components interacting with the communication links 208, 210. In particular, the communication module 226 may interact with the communication link 208 to communicate with the vehicle dashboard system 210 and interact with the communication link 210 to communicate with the user device 204. The communication links 208, 210 may be within one or more communication networks including, but not limited to, packet switched networks such as the Internet or circuit switching networks such as wired/wireless telephony. Therefore, the communication module 226 may receive and transmit any kind of network traffic, such as IP data packets and telephone calls.

The authentication module 228 may include hardware and software components implementing the authentication functionality described herein. In particular, the authentication module 228 may receive authentication requests, select a protocol for authentication (e.g., vehicle-based authentication), and execute the authentication protocol. The authentication module 228 may select the authentication protocol based upon the movement of the user device 204. The authentication module 228 may utilize the communication module 226 to communicate with one or more of the user device 204 and the vehicle dashboard system 210 while executing the authentication protocol.

The enterprise database 230 may be a database storing associations of users with one or more user devices (e.g., user device 204) and one or more vehicle dashboard systems (e.g., vehicle dashboard system 210), which may be utilized by the authentication module 228 for one or more authentication protocols. For example, a user may register the user device 204 and the vehicle dashboard system 210 with the authentication server 202 and enterprise database 230 may store the registration information. As a non-limiting example, the user may provide device identifiers of the user device 204 and the vehicle dashboard system 210. One or more of the device identifiers may be a media access control (MAC) identifier, a phone number, or an IP address. The enterprise database 230 may store a user identifier (e.g., name, e-mail address, or userID) in association with one or more of the device identifiers. The authentication module 228 may use one of the identifiers in a query to retrieve one or more of the other identifiers. For instance, the authentication module 228 may use a user identifier in a query sent to the enterprise database 230 to retrieve one or more of the device identifier of the user device 204 and vehicle dashboard system 210. It should, however, be understood that the aforementioned configuration of the enterprise database 230 within the authentication server 202 is merely illustrative and alternative configurations should be considered within the scope of this disclosure. For example, the enterprise database 230 may be hosted in a separate database server, which the authentication server 202 may access through one or more communication networks such as the Internet.

The user device 204 may be kind of computing device that may include or host an enterprise application 212, an authentication application 214, a GPS receiver 216, and a phone application. It should be understood that these components with the user device 204 are not intended to be illustrative and not exhaustive and alternate, additional, or fewer number of components should be considered within the scope of this disclosure.

The enterprise application 212 may be hosted by the user device 204. For example, in the embodiments where the user device 204 is a smartphone phone, the enterprise application 212 may be a smartphone app. The enterprise application 212 may allow the user to interact with an enterprise server (not shown). In an example, the enterprise server may host the user's bank account and the enterprise application 212 may provide the interface to the user for accessing the bank account in the enterprise server. The enterprise server 212 may require different levels of authentication (e.g., one or more multi-factor authentication protocols) for the functionality provided by the enterprise application 212 in association with the enterprise server. For the requisite level of authentication, the enterprise server 212 may invoke/utilize the authentication application 214.

The authentication application 214 may be hosted by the user device 204. In the embodiments with the user device 204 being a smartphone, the authentication application 214 may be smartphone app. The authentication application 214 may be a separate application or may be sub-module within the enterprise 212 with the separate authentication application 214 shown for the ease of explanation. Regardless of the form, the authentication application 214 may communicate with the authentication server 202 through the communication link 210 and/or to the vehicle dashboard system 210 through the communication link 206 for implementing the various authentication functionality described herein. For instance, the authentication application 214 may transmit an authentication request to the authentication server 202 and may in response receive requests from the authentication server 202. The authentication application 214 may transmit a stream of geolocation data of the user device 204 to the authentication server 202. The authentication application 214 may further query and retrieve another stream of geolocation data from the vehicle dashboard system 210 and transmit the stream to the authentication server 202.

The GPS receiver 216 may be a combination of hardware and software components in the user device 216 receiving GPS signals from a subset of GPS satellites. In particular, the GPS receiver 216 may receive the time signals from the subset of GPS satellites that the user device 204 may use to triangulate and geolocate the user device 204. The generated geolocation may be picked by the authentication application 214 and transmitted as geolocation data stream to the authentication server 202.

The phone application 218 may be hosted by the user device 204. The phone application 218 may provide an interface and functionality for the user to make phone calls through a circuit switched network. Additionally or alternatively, the phone application 218 may provide an interface and functionality for the user to make a phone call over a packet switched network, such as a Voice over Internet Protocol (VoIP) phone call. It should be understood that the phone application 218 also includes message and voice call services provided by social media platforms or any other type of communication platform. The user may use the phone application 218 to call an enterprise call center or an enterprise server. Alternatively, the user may use the enterprise application 212 to call the enterprise call center or the enterprise server. In some embodiments, the enterprise application 212 may automatically transfer a user from the enterprise application 212 to the phone application 218 when the user makes a phone call from the enterprise application 212.

The vehicle dashboard system 210 may be any kind of electronic system (e.g., a processor based system) in a vehicle. It should be understood that vehicle includes any form of transportation including but not limited to cars, buses, or trucks. The vehicle dashboard system 210 may include several hardware components such as display screens, microphones, speakers, physical buttons, processors, communication chips, and/or any other type of hardware components. In addition to the hardware components, the vehicle dashboard system 210 may include software modules, such as an operating system and drivers. Some illustrative sub-systems 220, 222, 224 formed by the hardware components and software modules (also referred to as software components) are described herein. However, it should be understood that these sub-systems 220, 222, 224 are merely for the ease of description and other types of sub-systems are to be considered within the scope of this disclosure.

A wide area connectivity sub-system 220 may include hardware and software components that allow the vehicle dashboard system 210 with wide area (e.g., non-local) networks such as the Internet. For example, the vehicle dashboard system 210 may utilize the wide area connectivity sub-system 220 to communicate with the authentication server 202 through the communication link 208. The authentication server 202 may therefore communicate with the vehicle system dashboard system 210 directly without necessarily going through the user device 204 to implement one or more authentication protocols described herein.

A local connectivity sub-system 222 may include hardware and software components that allow the vehicle dashboard system 210 to communicate with local (e.g., ad hoc) networks, such as Bluetooth networks. For instance, the vehicle dashboard system 210 may communicate with the user device 204 using a local communication link 206. Utilizing the local connectivity sub-system 222, the vehicle server may receive and transmit messages with the user device 204 to implement the one or more authentication protocols described herein. It should be understood that the receipt and transmission of messages utilizing the local connectivity sub-system 222 may be in addition to or as an alternate to the transmission and receipt of remote messages utilizing the wide area connectivity sub-system 220.

The vehicle dashboard system 210 may include a GPS receiver 224. The GPS receiver 224 may receive signals from the GPS satellites to geolocate the vehicle containing the vehicle dashboard system 210 through triangulation of the received signals. The vehicle dashboard system 210 may use the geolocation of the vehicle for its navigation sub-system (not shown). It should be understood that the GPS satellites described herein are not limited to the original GPS satellites but should encompass any current or future satellites providing geolocation functionality through the transmission of signals to terrestrial devices.

Figure 3:
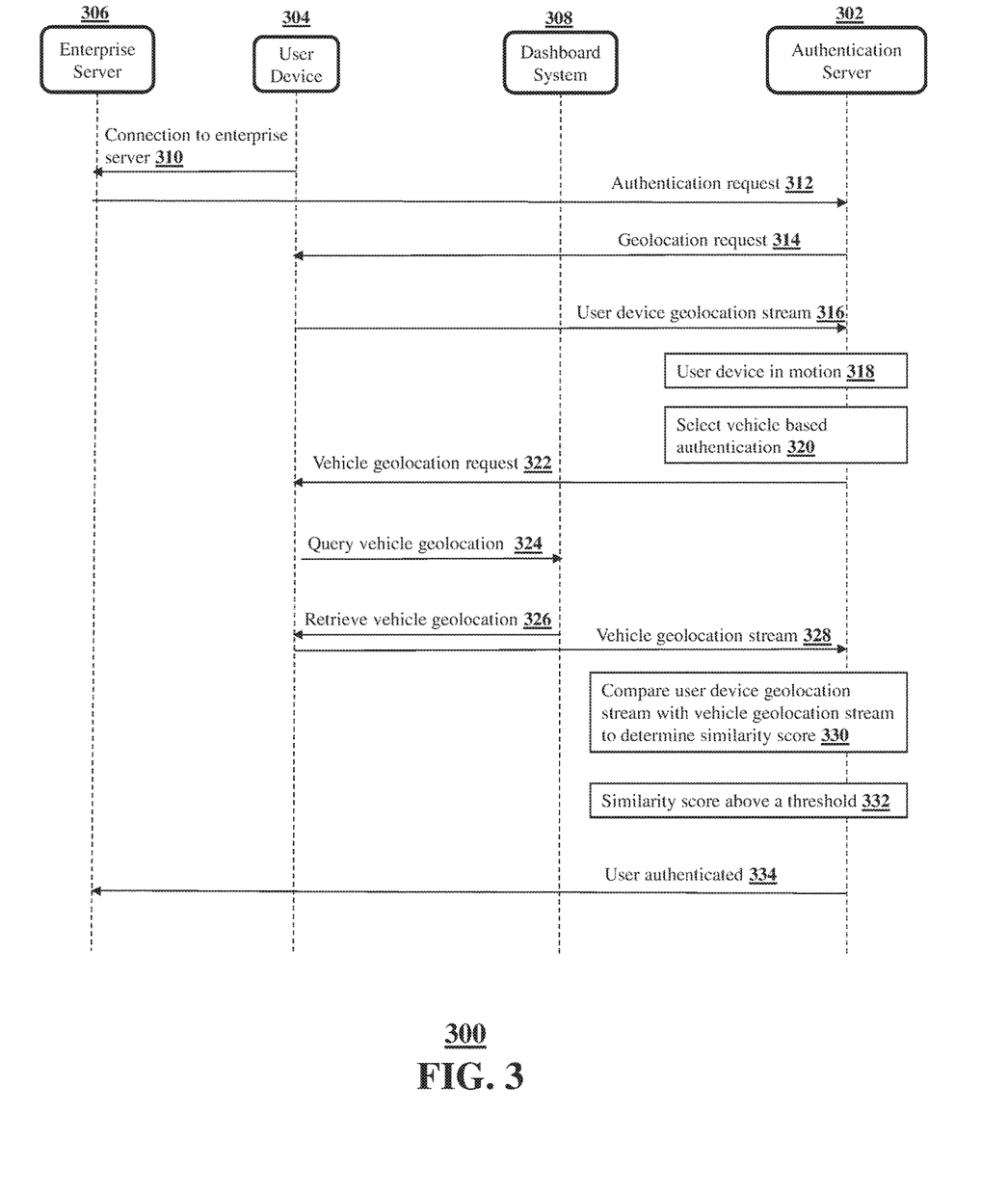
FIG. 3 shows a sequence diagram of an illustrative method of vehicle-based authentication, according to an embodiment.

FIG. 3 shows a process diagram of an illustrative method 300 of a vehicle-based authentication. It should be understood that the steps described herein are merely illustrative and additional, alternative, and fewer number of steps should be considered within the scope of this disclosure.

The method 300 may begin at step 310 when a user device 304 makes a connection request (or is connected) to an enterprise server 306. For example, the user device 304 may make a phone call to the enterprise server 306 or a data connection to the enterprise server 306 through an application running on the user device 304. Step 310 also includes the embodiments the user device 304 making a phone call a call center (not shown) of an enterprise. Regardless of the mode of the phone call in step 310, the enterprise server in step 312 may transmit an authentication request to an authentication server 302. In some embodiments, the authentication functionality provided by the authentication server 302 may be provided by the enterprise server 306 itself. In response to receiving the authentication request from the enterprise server 306, the authentication server 302 may transmit a geolocation data request to the user device 304 at step 314. The user device 304 may stream geolocation data at step 316. Utilizing the stream of geolocation data from the user device 304, the authentication server 302 may determine that the user device 302 is in motion at step 318. For example, the authentication server 302 may observe the rate of change of geolocation per unit time. In response to determining that the user device 304 is in motion, the authentication server 302 may select vehicle-based authentication at step 320.

After the authentication server 302 selects vehicle-based authentication, the authentication server 302 may transmit a vehicle geolocation data request to the user device 304 at step 322. The vehicle geolocation data request may be for the user device 304 to retrieve and transmit geolocation data of a vehicle associated (or registered) with the user. In response, the user device 304 may query vehicle geolocation data from the dashboard system 308 at step 324. For instance, the user device 304 may be connected to the dashboard system 308 through a Bluetooth connection and the user device 304 may perform the query through the Bluetooth connection. In response to the query, the dashboard system 308 may provide the vehicle geolocation data to the user device 304 at step 326. In other words, the user device 304 may retrieve vehicle geolocation data from the dashboard system 308 at step 326. At step 328, the user device 304 may stream vehicle geolocation data to the authentication server 302. At step 330, the authentication server 302 may compare the user device geolocation data stream with vehicle geolocation data stream to determine a similarity score. The similarity score may indicate the likelihood that user device 304 and the dashboard system 308 are in motion together through the same geolocations, as indicated by the aforementioned geolocation data streams. Therefore, the similarity score may indicate a likelihood that the user device 304 is in the vicinity of and moving along with a known/trusted vehicle. At step 332, the authentication server 302 may determine whether the similarity score is above a threshold. In response to determining that the similarity score is above the threshold, the authentications server 302 may authenticate the user and transmit a message that the user is authenticated to the enterprise server 306 at step 334.

Figure 4:
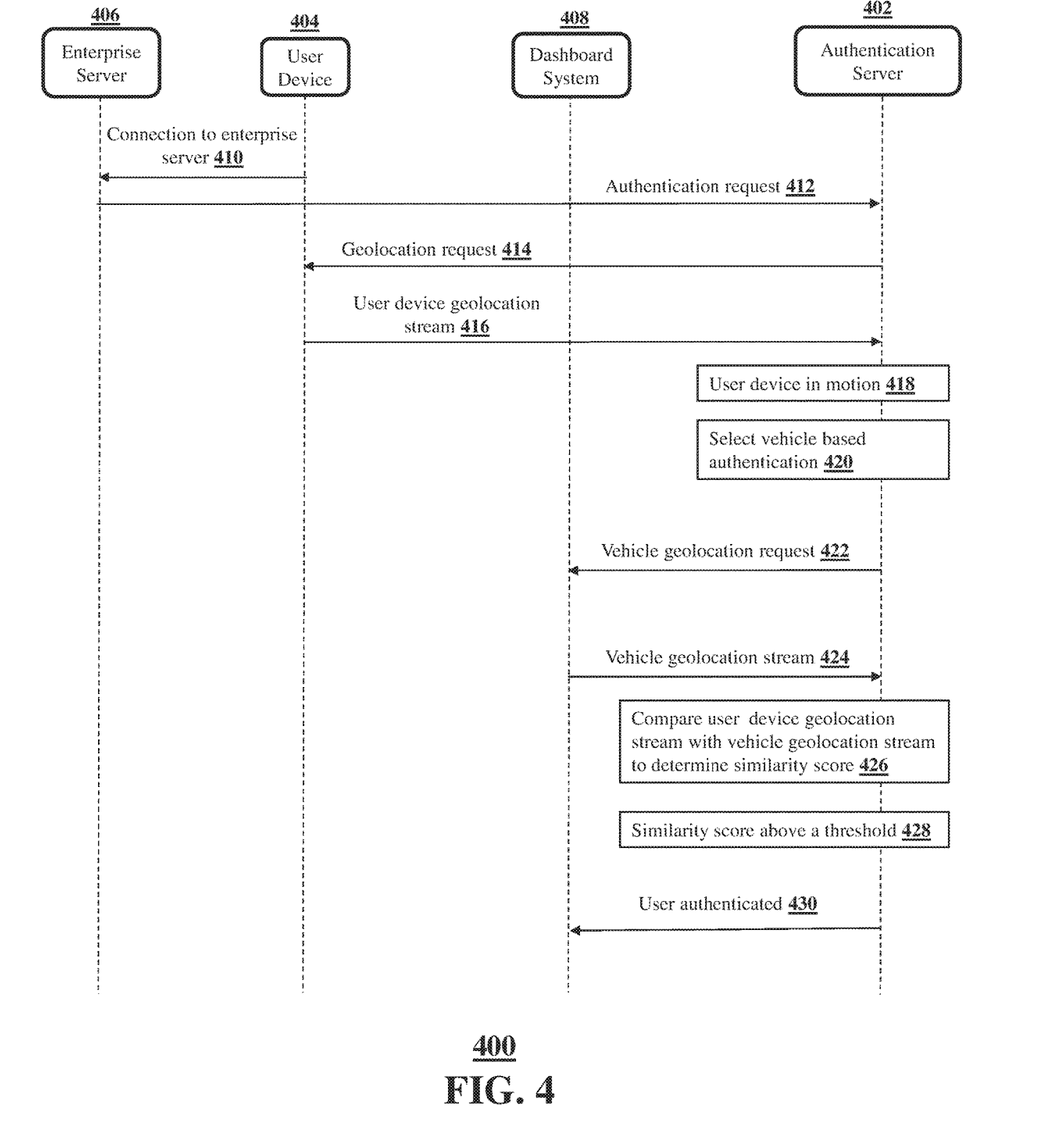
FIG. 4 shows sequence diagram of an illustrative method of vehicle-based authentication, according to an embodiment.

FIG. 4 shows a process diagram of an illustrative vehicle-based authentication method 400, according to an embodiment. It should be understood that the steps described herein are merely illustrative and methods with additional, alternative, and fewer number of steps should be considered within the scope of this disclosure.

The method may begin step 410, when a user makes a connection request (or is connected) to an enterprise server 406 through the user device 404. For example the user may make a phone call to the enterprise server 406 through the user device 404. Alternatively or additionally, the user may attempt to connect to the enterprise server 406 through an application running on the user device 404. It should be understood that the user calling a call center associated with the enterprise server 406 should also be considered within the scope of the step 410. In response to receiving the phone call, an indication of the phone call (e.g., through a call center agent), and/or the connection attempt, the enterprise server 406 may transmit an authentication request to the authentication server 402 at step 412. In response, the authentication server 402 may transmit a geolocation data request to the user device 404 at step 414. For example, the authentication server 402 may transmit the geolocation data request to an authentication application (or any other application) in the user device 404. The user device 404 may transmit geolocation data stream of the user device 404 at step 416. Based on the received geolocation data stream, the authentication server 402 may determine that the user device 404 is in motion at step 418. For instance, the authentication server 402 may observe that geolocation of the user device 404 changes with time indicating a motion. In response to determining that the user device 404 is in motion, the authentication server 402 may select vehicle-based authentication at step 420.

After the authentication server 402 selects vehicle-based authentication, the authentication server 402 may transmit a vehicle geolocation data request to the vehicle dashboard system 408 at step 422. In response to the query, the dashboard system 408 may stream vehicle geolocation data to the authentication server 402 at step 424. At step 426, the authentication server 402 may compare the user device geolocation data stream with the vehicle geolocation data stream to determine a similarity score. The similarity score may indicate the likelihood that user device 404 and the dashboard system 408 are in motion together through the same geolocations, as indicated by these geolocation data streams. Therefore, the similarity score may indicate a likelihood that the user device 404 is in the vicinity of and moving along with a known/trusted vehicle. At step 428, the authentication server 402 may determine whether the similarity score is above a threshold. In response to determining that the similarity score is above the threshold, the authentications server 402 may authenticate the user and transmit a message that the user is authenticated to the enterprise server 406 at step 430.

Figure 5:
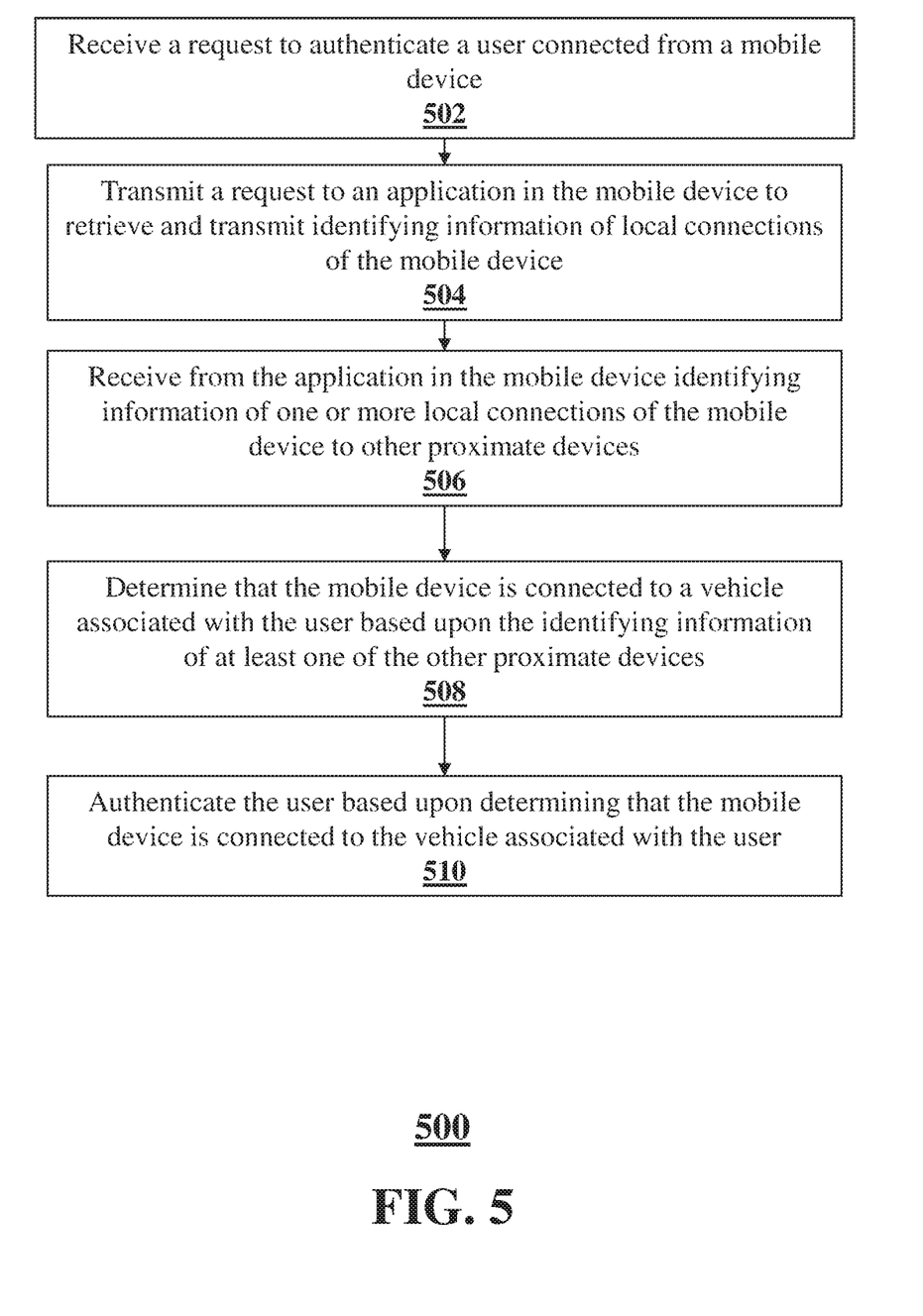
FIG. 5 shows a flow diagram of an illustrative method of vehicle-based authentication, according to an embodiment.

FIG. 5 shows a flow diagram of an illustrative method 500 of vehicle based authentication, according to an embodiment. It should be understood that the steps of the method 500 shown and described herein are merely illustrative and additional, alternative, and fewer number of steps should be considered within the scope of this disclosure. Although multiple computing systems may perform one or more steps of the method 500, the following describes a single authentication server performing all the steps.

The method 500 may begin at step 502 when the authentication server receives a request to authenticate a user connected from a mobile device (also referred to as a user device) to an enterprise server. For example, the user may be connected through a phone call using a telephony network or a packet-switching network (e.g., a VoIP call). The phone call may be to an enterprise server or to a call center associated with an enterprise server. As another example, the user may be connected through an application running on the mobile device. In these cases, user may request an access a functionality provided by the enterprise server and the enterprise server may have to authenticate the user to fulfil the access request. Accordingly, the enterprise server may transmit the request to authenticate the user to the authentication server.

At step 504, the authentication server may transmit a request to an application in the mobile device to retrieve and transmit identifying information of the local connections of the mobile device. The application in the mobile device may be a stand-alone authentication application or an enterprise application associated with the enterprise server. The local connections may include, for example, Bluetooth or BLE connections.

At step 506, the authentication server may receive from the application in the mobile device identifying information of one or more local connections of the mobile device to other proximate devices. For example, the authentication server may receive Bluetooth/BLE identifiers and/or MAC address of the other proximate devices that the mobile device is connected to through the one or more local connections.

At step 508, the authentication server may determine that the mobile device is connected to a vehicle associated with the user based upon the identifying information of at least one of the other proximate devices. For example, the identifying information may include a Bluetooth identifier of a vehicle dashboard system of a vehicle (e.g., a trusted vehicle) associated with the user. At step 510, the authentication server may authenticate the user based upon determining that the mobile device is connected to the vehicle associated with the user. A local connection to the trusted vehicle may indicate that the user is within or in proximity to the vehicle. In other words, the authentication server may carry over the trust in the vehicle associated with the user to authenticate the user.

It should be understood that authentication server may utilize that authentication method 500 for a weak authentication. For example, if the enterprise server provides a banking functionality, the authentication server may use the method 500 if the user merely requests information. The authentication server may use stronger authentication if the user requests to change/update one or more pieces of information.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not intended to be limiting. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, USB or removable flash drive, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method, comprising:
receiving, by a computer, a first request via a phone call from a mobile device, wherein the phone call is configured to initiate an authentication process for a user;
transmitting, by the computer, a second request to an application on the mobile device to stream geolocation data of the mobile device in response to receiving the first request;
receiving, by the computer, a first stream of geolocation data associated with the mobile device from the application in response to transmitting the second request;
determining, by the computer, that the mobile device is in motion based on the first stream of geolocation data; and
authenticating, by the computer, the user based on a vehicle-based authentication protocol in response to determining that the mobile device is in motion, wherein the vehicle-based authentication protocol is configured to cause the computer to:
query a database to identify a vehicle associated with the user based on a phone number that corresponds to the phone call;
transmit a third request to the application on the mobile device to retrieve a second stream of geolocation data from a vehicle system associated with the vehicle;
receive the second stream of geolocation data from the application, wherein the application is configured to receive the second stream of geolocation data from the vehicle system; and
compare the first stream of geolocation data to the second stream of geolocation data.

2. The method of claim 1, wherein the second stream of geolocation data is received from one or more sensors disposed on the vehicle and wherein authenticating the user comprises:
comparing, by the computer, the first stream of geolocation data and the second stream of geolocation data to determine a similarity score; and authenticating, by the computer, the user in response to the computer determining that the similarity score exceeds a predetermined threshold.

3. The method of claim 2, wherein the one or more sensors are part of a vehicle dashboard system.

4. The method of claim 3, comprising authenticating the user based on the vehicle-based authentication protocol in response to determining that the mobile device is communicatively coupled to the vehicle dashboard system.

5. The method of claim 4, wherein the mobile device is communicatively coupled to the vehicle dashboard system via Bluetooth.

6. A system, comprising:
a vehicle dashboard system disposed within a vehicle;
a computing device associated with a user; and
a server system comprising at least one processor configured to perform operations comprising:
receiving a first request via a phone call from a computing device, wherein the phone call is configured to initiate an authentication process for a user;
transmitting a second request to an application on the computing device to stream geolocation data of the computing device in response to receiving the first request;
receiving a first stream of geolocation data associated with the computing device from the application in response to transmitting the second request;
determining that the computing device is in motion based on the first stream of geolocation data; and
authenticating the user based on a vehicle-based authentication protocol in response to determining that the computing device is in motion by:
querying a database to identify registration data indicative of an association between the vehicle and a phone number that corresponds to the phone call;
transmitting a third request to the application to retrieve a second stream of geolocation data from the vehicle dashboard system;
receiving the second stream of geolocation data from the application, wherein the application is configured to receive the second stream of geolocation data from the vehicle dashboard system; and
comparing the first stream of geolocation data to the second stream of geolocation data.

7. The system of claim 6, wherein the vehicle dashboard system comprises a display, a microphone, one or more speakers, one or more buttons, one or more processors, or any combination thereof.

8. The system of claim 7, wherein
the second stream of geolocation data is received from one or more sensors that are part of the vehicle dashboard system, and wherein the at least one processor is configured to authenticate the user by:
comparing the first stream of geolocation data and the second stream of geolocation data to determine a similarity score; and
authenticating the user in response to determining that the similarity score exceeds a predetermined threshold.

9. The system of claim 7, wherein the phone call is received via a packet-switching network.

10. The system of claim 7, wherein the at least one processor is configured to determine that the computing device is in motion based on a plurality of geolocations and a plurality of times associated with the computing device, wherein the plurality of geolocations and the plurality of times are part of the first stream of geolocation data.

11. The system of claim 7, wherein the at least one processor is configured to authenticate the user based on the vehicle-based authentication protocol in response to determining that the computing device is communicatively coupled to the vehicle dashboard system.

12. The system of claim 11, wherein the computing device is communicatively coupled to the vehicle dashboard system via Bluetooth.

13. A non-transitory computer-readable medium comprising computer-executable instructions that, when executed, are configured to cause one or more processors to perform operations comprising:
receiving a first request via a phone call from a computing device, wherein the phone call is configured to initiate an authentication process for a user;
transmitting a second request to an application on the computing device to stream geolocation data of the computing device in response to receiving the first request;
receiving a first stream of geolocation data associated with the computing device from the application in response to transmitting the second request;
determining that the computing device is in motion based on the first stream of geolocation data; and
authenticating the user based on a vehicle-based authentication protocol in response to determining that the computing device is in motion, wherein the vehicle-based authentication protocol is configured to cause the one or more processors to perform the operations comprising:
querying a database to identify a vehicle associated with the user based on a phone number that corresponds to the phone call;
transmitting a third request to the application on the computing device to retrieve a second stream of geolocation data from a vehicle system associated with the vehicle;
receiving the second stream of geolocation data from the application, wherein the application is configured to receive the second stream of geolocation data from the vehicle system; and
comparing the first stream of geolocation data to the second stream of geolocation data.

14. The non-transitory computer-readable medium of claim 13, wherein the computer-executable instructions that, when executed, are configured to cause one or more processors to determine that the computing device is in motion based on a plurality of geolocations and a plurality of times associated with the computing device, wherein the plurality of geolocations and the plurality of times are part of the first stream of geolocation data.

15. The non-transitory computer-readable medium of claim 13, wherein the computer-executable instructions that, when executed, are configured to cause one or more processors to perform the operations comprising:
receiving the second stream of geolocation data from one or more sensors that are part of the vehicle system disposed in the vehicle, and wherein authenticating the user comprises:
comparing the first stream of geolocation data and the second stream of geolocation data to determine a similarity score; and authenticating the user in response to determining that the similarity score exceeds a predetermined threshold.

* * * * *